US012564124B2

(12) United States Patent
Weis et al.

(10) Patent No.: US 12,564,124 B2
(45) Date of Patent: Mar. 3, 2026

(54) TWO ROW AGRICULTURAL PLANTING IMPLEMENT HAVING A LIFT AND DOWNFORCE ACTUATOR

(71) Applicant: CNH Industrial America LLC, New Holland, PA (US)

(72) Inventors: Jacob Allan Weis, Bolingbrook, IL (US); Christopher Huber, Gurnee, IL (US); Brian John Anderson, Yorkville, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 679 days.

(21) Appl. No.: 17/389,439

(22) Filed: Jul. 30, 2021

(65) Prior Publication Data

US 2023/0036264 A1     Feb. 2, 2023

(51) Int. Cl.
*A01C 7/20* (2006.01)
*A01B 63/00* (2006.01)
(Continued)

(52) U.S. Cl.
CPC ............ *A01C 7/205* (2013.01); *A01B 63/008* (2013.01); *A01B 63/32* (2013.01); *A01B 73/065* (2013.01); *A01C 7/208* (2013.01)

(58) Field of Classification Search
CPC ....... A01C 7/205; A01C 7/208; A01B 73/065; A01B 63/008; A01B 63/24; A01B 63/32; A01B 49/027
See application file for complete search history.

(56) References Cited

U.S. PATENT DOCUMENTS

| | | | | | |
|---|---|---|---|---|---|
| 6,044,916 | A | * | 4/2000 | Hundeby | A01C 5/062 |
| | | | | | 172/637 |
| 6,205,937 | B1 | * | 3/2001 | Shoup | A01B 73/00 |
| | | | | | 172/311 |

(Continued)

FOREIGN PATENT DOCUMENTS

WO        2019123040        6/2019

OTHER PUBLICATIONS

Screen capture from YouTube video clip entitled "Horsch Product Series: Maestro SV," 1 page, uploaded on Oct. 1, 2020 by user "Horsch North America". Retrieved from Internet: https://www.youtube.com/watch?v=K_vk5DyR9z8.

(Continued)

*Primary Examiner* — Christopher J Sebesta
*Assistant Examiner* — Blake E Scoville
(74) *Attorney, Agent, or Firm* — Fletcher Yoder, P.C.

(57) ABSTRACT

An agricultural planting implement includes a first wing toolbar configured to support a first set of row units and a second wing toolbar configured to support a second set of row units. The agricultural planting implement also includes a connection assembly having at least one arm pivotally coupling the second wing toolbar to the first wing toolbar. The at least one arm is pivotally coupled to the first wing toolbar and non-pivotally coupled to the second wing toolbar. In addition, the connection assembly includes an actuator configured to drive the second wing toolbar to rotate upwardly relative to the first wing toolbar from a working position to a transport position. The actuator is also configured to urge the second wing toolbar downwardly toward a soil surface while the second wing toolbar is in the working position.

20 Claims, 4 Drawing Sheets

(51) Int. Cl.
*A01B 63/32* (2006.01)
*A01B 73/06* (2006.01)

(56) References Cited

U.S. PATENT DOCUMENTS

| | | | |
|---|---|---|---|
| 6,460,623 | B1 | 10/2002 | Knussman et al. |
| 6,675,907 | B2 * | 1/2004 | Moser .................. A01B 73/044 |
| | | | 172/463 |
| 6,701,857 | B1 | 3/2004 | Jensen et al. |
| 7,051,663 | B2 | 5/2006 | Mever et al. |
| D559,868 | S | 1/2008 | Nanawala et al. |
| 7,743,844 | B2 | 6/2010 | Kovach et al. |
| D627,373 | S | 11/2010 | Prickel et al. |
| D629,426 | S | 12/2010 | Prickel et al. |
| D629,427 | S | 12/2010 | Prickel et al. |
| D631,068 | S | 1/2011 | Prickel et al. |
| 8,056,465 | B2 | 11/2011 | Carlz |
| 8,176,992 | B2 | 5/2012 | Yuen |
| 8,275,525 | B2 | 9/2012 | Kowalchuk et al. |
| D680,559 | S | 4/2013 | Blunier et al. |
| 8,522,889 | B2 | 9/2013 | Adams et al. |
| 8,544,397 | B2 | 10/2013 | Bassett |
| 8,544,398 | B2 | 10/2013 | Bassett |
| 8,567,517 | B2 | 10/2013 | Friggstad et al. |
| 8,573,111 | B2 | 11/2013 | Graham et al. |
| 8,727,032 | B2 * | 5/2014 | Friggstad ............. A01B 73/065 |
| | | | 172/311 |
| 8,733,256 | B2 * | 5/2014 | Kinzenbaw .......... A01B 73/048 |
| | | | 111/67 |
| 8,939,095 | B2 | 1/2015 | Freed |
| 9,144,189 | B2 | 9/2015 | Stoller et al. |
| 9,198,343 | B2 | 12/2015 | Mariman et al. |
| D758,458 | S | 6/2016 | Anderson et al. |
| D766,333 | S | 9/2016 | Anderson et al. |
| 9,554,504 | B2 | 1/2017 | Houck |
| 9,675,004 | B2 | 6/2017 | Landphair et al. |
| 9,681,601 | B2 | 6/2017 | Bassett |
| 9,723,776 | B2 | 8/2017 | Sporrer et al. |
| 9,723,778 | B2 | 8/2017 | Bassett |
| 9,814,172 | B2 | 11/2017 | Achen et al. |
| 9,879,702 | B2 | 1/2018 | Stoller et al. |
| 9,883,623 | B2 | 2/2018 | Koch et al. |
| 9,883,626 | B2 | 2/2018 | Heim et al. |
| D813,914 | S | 3/2018 | Horsch |
| D813,915 | S | 3/2018 | Horsch |
| 9,936,624 | B2 | 4/2018 | Nininger |
| 9,968,030 | B2 | 5/2018 | Kowalchuk et al. |
| 10,045,474 | B2 | 8/2018 | Bachman et al. |
| 10,126,073 | B2 | 11/2018 | Agner et al. |
| D835,161 | S | 12/2018 | Blackwell |
| 10,143,128 | B2 | 12/2018 | Landphair et al. |
| 10,149,424 | B2 | 12/2018 | Maust et al. |
| D847,212 | S | 4/2019 | Dienst et al. |
| 10,251,333 | B2 | 4/2019 | Bassett |
| D849,801 | S | 5/2019 | Dienst et al. |
| 10,349,571 | B2 | 7/2019 | Fink et al. |
| 10,412,877 | B2 | 9/2019 | Barrick et al. |
| 10,426,073 | B2 * | 10/2019 | Totten .................. A01B 63/163 |
| 10,477,753 | B2 | 11/2019 | Achen et al. |
| 10,512,202 | B2 | 12/2019 | Adams et al. |
| 10,537,055 | B2 | 1/2020 | Gresch et al. |
| 10,548,260 | B2 | 2/2020 | Bassett |
| D880,534 | S | 4/2020 | Kuboushek et al. |
| D880,535 | S | 4/2020 | Dienst et al. |
| 10,617,057 | B2 * | 4/2020 | Connell ............... A01C 21/005 |
| D884,750 | S | 5/2020 | Leeb |
| 10,645,865 | B2 | 5/2020 | Bassett |
| D900,885 | S | 11/2020 | Kuboushek et al. |
| 10,820,476 | B2 | 11/2020 | Stoller et al. |
| D958,196 | S | 7/2022 | Mariman et al. |
| 11,399,453 | B2 * | 8/2022 | Preimess ............... A01B 63/111 |
| 2006/0021768 | A1 | 2/2006 | Ankenman |
| 2006/0090910 | A1 * | 5/2006 | Houck ................... A01B 73/00 |
| | | | 172/272 |
| 2007/0163791 | A1 | 7/2007 | Meek |
| 2009/0178600 | A1 | 7/2009 | Horn et al. |
| 2009/0199750 | A1 | 8/2009 | Rice et al. |
| 2009/0229501 | A1 | 9/2009 | Jaime et al. |
| 2010/0126743 | A1 | 5/2010 | Poole et al. |
| 2010/0126744 | A1 | 5/2010 | Poole |
| 2012/0175138 | A1 * | 7/2012 | Friggstad ............. A01B 73/065 |
| | | | 172/311 |
| 2013/0032362 | A1 | 2/2013 | Rylander |
| 2013/0233580 | A1 * | 9/2013 | Kinzenbaw .......... A01B 73/065 |
| | | | 172/1 |
| 2015/0150185 | A1 * | 6/2015 | Houck ................... A01B 63/16 |
| | | | 172/388 |
| 2015/0271985 | A2 | 10/2015 | Stoller et al. |
| 2016/0309641 | A1 | 10/2016 | Tauton et al. |
| 2017/0208733 | A1 | 7/2017 | Sterchi |
| 2018/0325021 | A1 * | 11/2018 | Connell ............... A01B 73/044 |
| 2019/0029165 | A1 | 1/2019 | Leimkeuhler et al. |
| 2019/0072114 | A1 | 3/2019 | Myers et al. |
| 2019/0183036 | A1 | 6/2019 | Leimkeuhler et al. |
| 2019/0373797 | A1 | 12/2019 | Schoeny et al. |
| 2020/0068778 | A1 | 3/2020 | Schoeny et al. |
| 2020/0084951 | A1 | 3/2020 | Fanshier et al. |
| 2020/0093052 | A1 * | 3/2020 | Preimess ............... A01B 63/111 |
| 2020/0288620 | A1 | 9/2020 | Chwialkowski |
| 2020/0404837 | A1 | 12/2020 | Thompson et al. |

OTHER PUBLICATIONS

U.S. Appl. No. 17/384,289, filed Jul. 23, 2021, Johnathon Raymond Dienst.

U.S. Appl. No. 29/800,851, filed Jul. 23, 2021, Johnathon Raymond Dienst.

U.S. Appl. No. 29/800,811, filed Jul. 23, 2021, Johnathon Raymond Dienst.

U.S. Appl. No. 29/800,795, filed Jul. 23, 2021, Johnathon Raymond Dienst.

Office Action, U.S. Appl. No. 17/384,289, dated Jul. 2, 2024.

* cited by examiner

TWO ROW AGRICULTURAL PLANTING IMPLEMENT HAVING A LIFT AND DOWNFORCE ACTUATOR

BACKGROUND

The present disclosure relates generally to a two row agricultural planting implement having a lift and downforce actuator.

Generally, agricultural planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product conveying system (e.g., seed tube or powered agricultural product conveyor) is configured to deposit seeds and/or other agricultural products (e.g., fertilizer) into the trench. The opener/agricultural product conveying system is followed by closing discs that move displaced soil back into the trench and/or a packer wheel that packs the soil on top of the deposited seeds/other agricultural products.

Planting implements typically include at least one toolbar configured to support the row units. For example, certain planting implements have a left wing toolbar and a right wing toolbar. Each wing toolbar may be pivotally coupled to a main frame, and each wing toolbar may support multiple row units. For example, the row units may be distributed along a length of each wing toolbar. During planting operations, the left and right wing toolbars may be oriented substantially perpendicularly to a direction of travel of the planting implement. In addition, the left and right wing toolbars may be folded forwardly to a transport position to reduce the width of the planting implement for transport. Unfortunately, due to the width of each row unit, the spacing between row units arranged along the length of each wing toolbar may be limited, thereby limiting the spacing between rows of deposited seeds/other agricultural product.

BRIEF DESCRIPTION

In certain embodiments, an agricultural planting implement includes a first wing toolbar configured to support a first set of row units and a second wing toolbar configured to support a second set of row units. The agricultural planting implement also includes a connection assembly having at least one arm pivotally coupling the second wing toolbar to the first wing toolbar. The at least one arm is pivotally coupled to the first wing toolbar and non-pivotally coupled to the second wing toolbar. In addition, the connection assembly includes an actuator configured to drive the second wing toolbar to rotate upwardly relative to the first wing toolbar from a working position to a transport position. The actuator is also configured to urge the second wing toolbar downwardly toward a soil surface while the second wing toolbar is in the working position.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
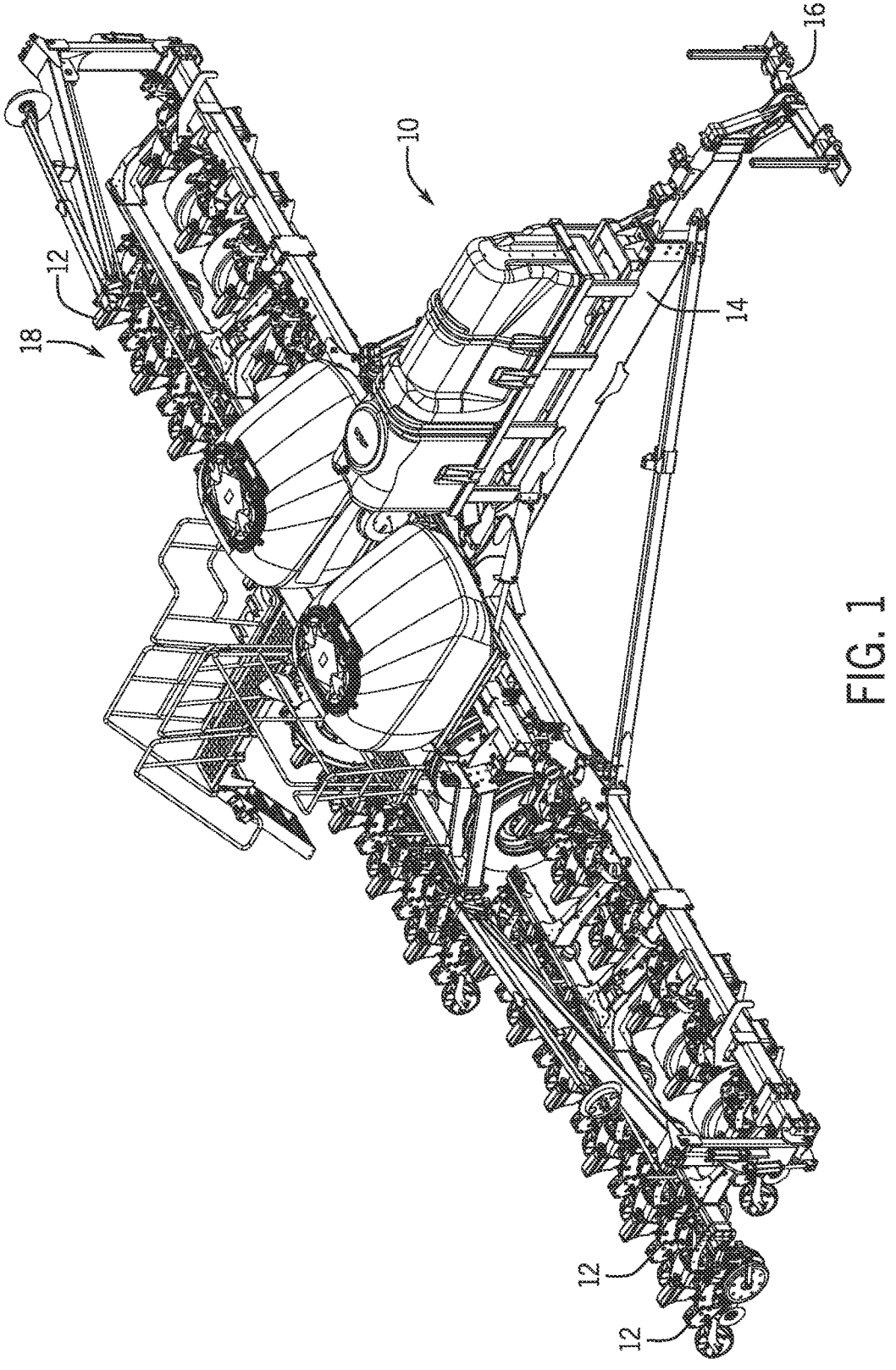
FIG. 1 is a perspective view of an embodiment of an agricultural planting implement having multiple row units distributed across a width of the agricultural implement.

FIG. 1 is a perspective view of an embodiment of an agricultural planting implement 10 having multiple row units 12 distributed across a width of the agricultural planting implement 10. The agricultural planting implement 10 is configured to be towed through a field behind a work vehicle, such as a tractor. As illustrated, the agricultural implement 10 includes a main frame 14 and a hitch 16 coupled to the main frame 14. The hitch 16 is configured to couple the agricultural planting implement 10 to an appropriate work vehicle hitch (e.g., three-point hitch, etc.). The main frame 14 is coupled to a toolbar assembly 18, which supports multiple row units 12. Each row unit 12 may include one or more opener discs configured to form a seed path (e.g., trench) within soil of a field. The row unit 12 may also include an agricultural product conveying system (e.g., seed tube or powered agricultural product conveyer) configured to deposit seeds and/or other agricultural product(s) (e.g., fertilizer) into the seed path/trench. In addition, the row unit 12 may include closing disc(s) and/or a packer wheel positioned behind the agricultural product conveying system. The closing disc(s) are configured to move displaced soil back into the seed path/trench, and the packer wheel is configured to pack soil on top of the deposited seeds/other agricultural product(s). While the illustrated agricultural planting implement 10 includes thirty-two row units 12, in other embodiments, the agricultural planting implement may include more or fewer row units (e.g., 12, 16, 23, 24, 31, 48, or more).

Figure 2:
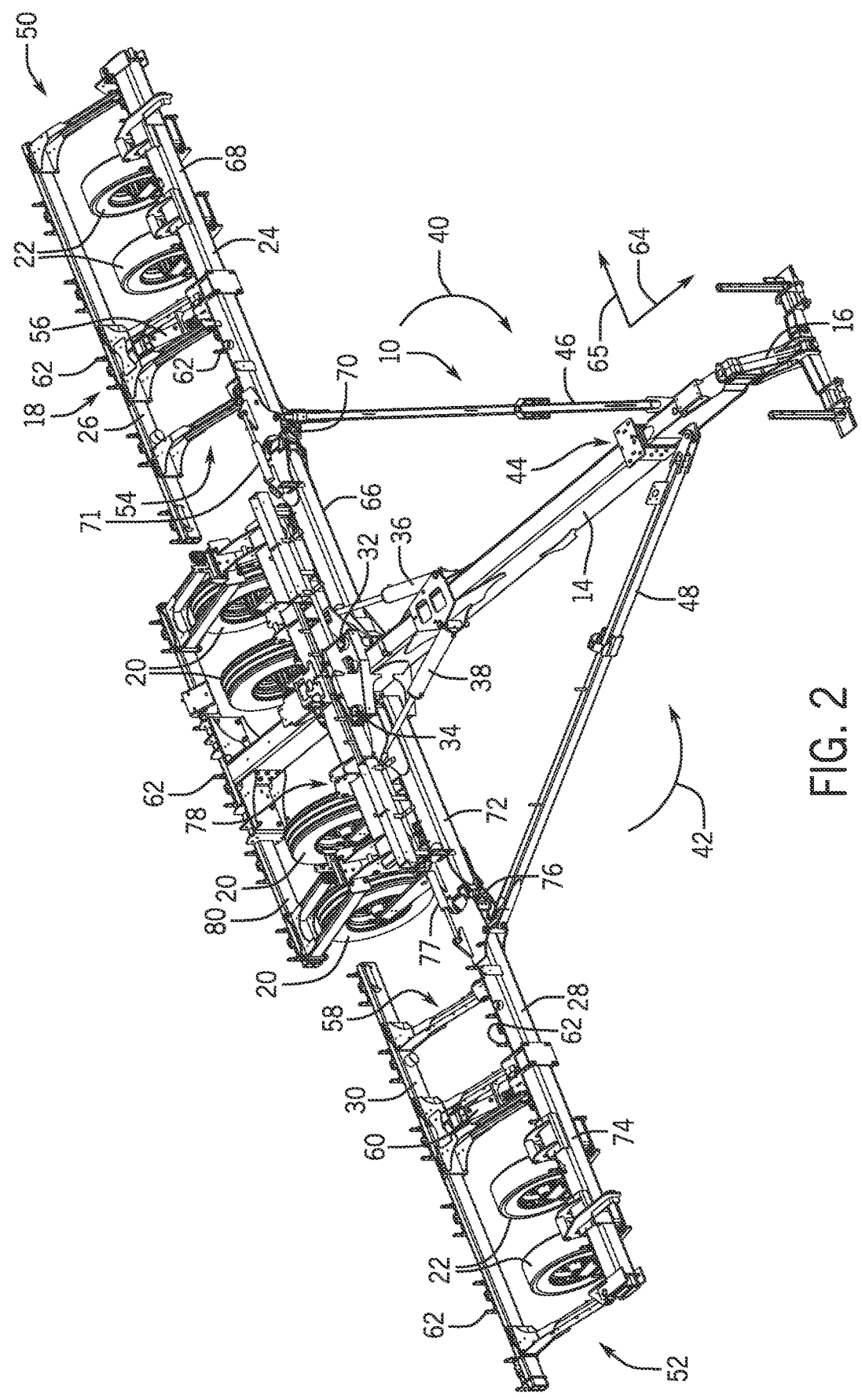
FIG. 2 is a perspective view of a portion of the agricultural planting implement of FIG. 1, in which the agricultural planting implement is in a working configuration.

FIG. 2 is a perspective view of a portion of the agricultural planting implement 10 of FIG. 1, in which the agricultural planting implement is in a working configuration. In the illustrated embodiment, the agricultural planting implement 10 includes main wheel assemblies 20 and wing wheel assemblies 22. The main wheel assemblies 20 are configured to support a portion of the weight of the toolbar assembly 18, the main frame 14, the row units, agricultural product storage tank(s), agricultural product (e.g., seed, fertilizer, etc.) within the agricultural product storage tank(s), and other components of the agricultural planting implement. In addition, the wing wheel assemblies 22 are configured to support a portion of the weight of the toolbar assembly 18, the row units, and other components of the agricultural planting implement. With the agricultural planting implement 10 in the illustrated working configuration, the main wheel assemblies 20 are positioned in a working position, and the wing wheel assemblies 22 are positioned in a working position. As a result, the row units are positioned to engage the soil, thereby enabling the row units to deposit agricultural product (e.g., seed, fertilizer, etc.) within the soil as the agricultural planting implement 10 traverses a field. To transition the agricultural planting implement 10 to a headland turn configuration, the main wheel assemblies 20 may be lowered relative to the main frame 14 to a headland turn position, and the wing wheel assemblies 22 may be lowered relative to the toolbar assembly 18 to a headland turn position, thereby driving the row units to disengage the soil. The agricultural planting implement 10 may then complete a headland turn, and the main wheel assemblies 20 and the wing wheel assemblies 22 may be returned to the respective working positions, thereby enabling planting operations to continue.

To transition the agricultural planting implement 10 to a transport configuration (e.g., for moving the agricultural planting implement between fields, for moving the agricultural planting implement to a storage area, etc.), the main wheel assemblies 20 and the wing wheel assemblies 22 may be transitioned to the respective headland turn positions, thereby disengaging the row units from the soil. The wing toolbars of the toolbar assembly 18 may then be folded forwardly, as discussed in detail below. As the wing toolbars of the toolbar assembly 18 fold forwardly, the wing wheel assemblies 22 support the wing toolbars. Once the wing toolbars of the toolbar assembly 18 are folded forwardly, the main wheel assemblies 20 may be lowered relative to the main frame 14 to a transport position below the headland turn position, thereby positioning the wing wheel assemblies 22, which are oriented perpendicularly to the direction of travel while the wing toolbars are folded forwardly, above the soil surface. The agricultural planting implement 10 may then be moved to a desired location. The agricultural planting implement includes actuators (e.g., hydraulic actuator(s), electromechanical actuator(s), pneumatic actuator(s), etc.) configured to drive the wheel assemblies between the respective positions.

In the illustrated embodiment, the toolbar assembly 18 includes a first left wing toolbar 24, a second left wing toolbar 26, a first right wing toolbar 28, and a second right wing toolbar 30. The first left wing toolbar 24 is pivotally coupled to the main frame 14 by a left pivot joint 32, and the first right wing toolbar 28 is pivotally coupled to the main frame 14 by a right pivot joint 34. In addition, the agricultural planting implement 10 includes a left wing actuator 36

(e.g., second actuator, second left actuator) extending between the main frame 14 and the first left wing toolbar 24, and the agricultural planting implement 10 includes a right wing actuator 38 (e.g., second actuator, second right actuator) extending between the main frame 14 and the first right wing toolbar 28. The left wing actuator 36 is configured to drive the first left wing toolbar 24 and the second left wing toolbar 26 from the illustrated unfolded position to a folded position along a first forward direction 40. Furthermore, the right wing actuator 38 is configured to drive the first right wing toolbar 28 and the second right wing toolbar 30 from the illustrated unfolded position to a folded position along a second forward direction 42. The wing actuators are also configured to drive the respective wing toolbars from the folded position to the unfolded position. Each wing actuator may include any suitable type(s) of actuator(s), such as hydraulic actuator(s), pneumatic actuator(s), electromechanical actuator(s), other suitable type(s) of actuator(s), or a combination thereof.

In the illustrated embodiment, the main frame 14 includes a telescoping section 44 configured to extend as the wing toolbars are folded forwardly and to retract as the wing toolbars are folded rearwardly. In addition, the agricultural planting implement 10 includes a left support 46 and a right support 48. The left support 46 extends between the main frame 14 and the first left wing toolbar 24, and the right support 48 extends between the main frame 14 and the first right wing toolbar 28. As the left wing actuator 36 drives the first left wing toolbar 24 to rotate in the first forward direction 40 and the right wing actuator 38 drives the first right wing toolbar 28 to rotate in the second forward direction 42, the left support 46 and the right support 48 drive the telescoping section 44 of the main frame 14 to extend (e.g., increasing the distance between the hitch 16 and the main wheel assemblies 20). In addition, as the wing actuators drive the respective wing toolbars to rotate rearwardly, the left support 46 and the right support 48 drive the telescoping section 44 of the main frame 14 to retract (e.g., decreasing the distance between the hitch 16 and the main wheel assemblies 20).

Furthermore, once the wing toolbars are folded forwardly, the second left wing toolbar 26 may be raised from the illustrated working position to a transport position, and the second right wing toolbar 30 may be raised from the illustrated working position to a transport position. In the illustrated embodiment, the second left wing toolbar 26 is pivotally coupled to the first left wing toolbar 24 by a left connection assembly 50, and the second right wing toolbar 30 is pivotally coupled to the first right wing toolbar 28 by a right connection assembly 52. The left connection assembly 50 includes one or more arms 54 (e.g., left arm(s)) pivotally coupling the second left wing toolbar 26 to the first left wing toolbar 24, in which each arm is pivotally coupled to the first left wing toolbar 24 and non-pivotally coupled to the second left wing toolbar 26. In the illustrated embodiment, the left connection assembly 50 includes three arms 54 spaced apart from one another along a length of the first left wing toolbar 24. However, in other embodiments, the left connection assembly may include more or fewer arms (e.g., 1, 2, 4, 5, 6, or more). In addition, the left connection assembly 50 includes a left actuator 56 configured to drive the second left wing toolbar 26 to rotate relative to the first left wing toolbar 24. In the illustrated embodiment, the left actuator 56 includes a linear actuator (e.g., hydraulic cylinder, pneumatic cylinder, linear electromechanical actuator, etc.) pivotally coupled to the first left wing toolbar 24 and pivotally coupled to one of the arms 54. However, in other embodiments, the left actuator may be pivotally coupled to the second left wing toolbar and pivotally coupled to one of the arms, or the left actuator may be pivotally coupled to the first left wing toolbar and pivotally coupled to the second left wing toolbar. Furthermore, while the left actuator includes a linear actuator in the illustrated embodiment, in other embodiments, the left actuator may include a rotary actuator, such as an electric motor, a hydraulic motor, a pneumatic motor, or another suitable type of rotary actuator. In addition, while linear and rotary actuators are disclosed above, in certain embodiments, the left actuator may include another suitable type of actuator.

Furthermore, the right connection assembly 52 includes one or more arms 58 (e.g., right arm(s)) pivotally coupling the second right wing toolbar 30 to the first right wing toolbar 28, in which each arm is pivotally coupled to the first right wing toolbar 28 and non-pivotally coupled to the second right wing toolbar 30. In the illustrated embodiment, the right connection assembly 52 includes three arms 58 spaced apart from one another along a length of the first right wing toolbar 28. However, in other embodiments, the right connection assembly may include more or fewer arms (e.g., 1, 2, 4, 5, 6, or more). The right connection assembly 52 also includes a right actuator 60 configured to drive the second right wing toolbar 30 to rotate relative to the first right wing toolbar 28. In the illustrated embodiment, the right actuator 60 includes a linear actuator (e.g., hydraulic cylinder, pneumatic cylinder, linear electromechanical actuator, etc.) pivotally coupled to the first right wing toolbar 28 and pivotally coupled to one of the arms 58. However, in other embodiments, the right actuator may be pivotally coupled to the second right wing toolbar and pivotally coupled to one of the arms, or the right actuator may be pivotally coupled to the first right wing toolbar and pivotally coupled to the second right wing toolbar. Furthermore, while the right actuator includes a linear actuator in the illustrated embodiment, in other embodiments, the right actuator may include a rotary actuator, such as an electric motor, a hydraulic motor, a pneumatic motor, or another suitable type of rotary actuator. In addition, while linear and rotary actuators are disclosed above, in certain embodiments, the right actuator may include another suitable type of actuator.

The left actuator 56 is configured to drive the second left wing toolbar 26 to rotate from the illustrated working position to the transport position, in which the second left wing toolbar 26 is positioned above the first left wing toolbar 24, and the right actuator 60 is configured to drive the second right wing toolbar 30 to rotate from the illustrated working position to the transport position, in which the second right wing toolbar 30 is positioned above the first right wing toolbar 28. The left actuator 56 is also configured to drive the second left wing toolbar 26 to rotate from the transport position to the illustrated working position, and the right actuator 60 is configured to drive the second right wing toolbar 30 to rotate from the transport position to the illustrated working position. In addition, as discussed in detail below, the left actuator 56 is configured to urge the second left wing toolbar 26 downwardly toward the soil surface while the second left wing toolbar 26 is in the working position. Furthermore, as discussed in detail below, the right actuator 60 is configured to urge the second right wing toolbar 30 downwardly toward the soil surface while the second right wing toolbar 30 is in the working position.

In the illustrated embodiment, each wing toolbar includes multiple mounts 62, and each mount 62 is configured to couple a respective row unit to the wing toolbar. For example, in certain embodiments, each row unit may be coupled to a respective mount 62 by a linkage assembly that facilitates vertical movement of the row unit relative to the respective mount. With respect to the left wing toolbars, the first left wing toolbar 24 may support a first set of row units, the second left wing toolbar 26 may support a second set of row units, and each set may include multiple row units. In addition, with respect to the right wing toolbars, the first right wing toolbar 28 may support a first set of row units, the second right wing toolbar 30 may support a second set of row units, and each set may include multiple row units. While the second left wing toolbar 26 is in the illustrated working position, the second left wing toolbar 26 is positioned behind the first left wing toolbar 24 along a direction of travel 64 of the agricultural planting implement 10. In addition, while the second right wing toolbar 30 is in the illustrated working position, the second right wing toolbar 30 is positioned behind the first right wing toolbar 28 along the direction of travel 64.

In the illustrated embodiment, the mounts 62 of each first wing toolbar are laterally offset (e.g., offset along a lateral axis 65 perpendicular to the direction of travel 64) from the mounts 62 of the respective second wing toolbar. Accordingly, the row units supported by each first wing toolbar (e.g., first set of row units) are laterally offset from the row units supported by the respective second wing toolbar (e.g., second set of row units). As previously discussed, each row unit may establish a respective row of deposited agricultural product as the agricultural planting implement 10 traverses a field along the direction of travel 64. Because the row units are distributed across the first wing toolbars and the second wing toolbars, the spacing between row units along the lateral axis 65 may be reduced (e.g., as compared to the spacing between row units supported by single wing toolbars). As a result, narrower spacing between rows of deposited agricultural product may be established. For example, the row units of the illustrated agricultural planting implement 10 may be positioned to establish 15-inch or 20-inch row spacing.

In the illustrated embodiment, the first left wing toolbar 24 has a first section 66 and a second section 68. The first section 66 is pivotally coupled to the main frame 14 by the left pivot joint 32, and the second section 68 is pivotally coupled to the first section 66 by a left wing joint 70. The left wing joint 70 enables the second section 68 to rotate relative to the first section 66 about an axis substantially parallel to the direction of travel 64, thereby enabling the first left wing toolbar 24 to follow contours within the field. In addition, the agricultural planting implement 10 includes a left wing actuator 71 (e.g., first wing actuator) coupled to the first and second sections of the first left wing toolbar 24. The left wing actuator 71 (e.g., hydraulic linear actuator, hydraulic rotary actuator, pneumatic linear actuator, pneumatic rotary actuator, linear electromechanical actuator, motor, etc.) is configured to urge the second section 68 of the first left wing toolbar 24 toward the soil surface. The force applied by the left wing actuator 71 may be controlled to control the force applied by the row units coupled to the second section 68 of the first left wing toolbar 24 and the row units coupled to the second left wing toolbar 26.

In the illustrated embodiment, the second left wing toolbar 26 is pivotally coupled to the second section 68 of the first left wing toolbar 24 by the left connection assembly 50. However, in other embodiments, the second left wing toolbar may be pivotally coupled to the first section of the first left wing toolbar by the left connection assembly. While the first left wing toolbar 24 has two sections in the illustrated embodiment, in other embodiments, the first left wing toolbar may include more or fewer sections (e.g., 1, 3, 4, or more), in which each pair of adjacent sections is pivotally coupled by a respective left wing joint. Furthermore, while the second left wing toolbar 26 has a single section in the illustrated embodiment, in other embodiments, the second left wing toolbar may include multiple sections (e.g., pivotally coupled to one another, spaced apart from one another, etc.), and each section of the second left wing toolbar may be pivotally coupled to a respective section of the first left wing toolbar.

Furthermore, in the illustrated embodiment, the first right wing toolbar 28 has a first section 72 and a second section 74. The first section 72 is pivotally coupled to the main frame 14 by the right pivot joint 34, and the second section 74 is pivotally coupled to the first section 72 by a right wing joint 76. The right wing joint 76 enables the second section 74 to rotate relative to the first section 72 about an axis substantially parallel to the direction of travel 64, thereby enabling the first right wing toolbar 28 to follow contours within the field. In addition, the agricultural planting implement 10 includes a right wing actuator 77 (e.g., first wing actuator) coupled to the first and second sections of the first right wing toolbar 28. The right wing actuator 77 (e.g., hydraulic linear actuator, hydraulic rotary actuator, pneumatic linear actuator, pneumatic rotary actuator, linear electromechanical actuator, motor, etc.) is configured to urge the second section 74 of the first right wing toolbar 28 toward the soil surface. The force applied by the right wing actuator 77 may be controlled to control the force applied by the row units coupled to the second section 74 of the first right wing toolbar 28 and the row units coupled to the second right wing toolbar 30.

In the illustrated embodiment, the second right wing toolbar 30 is pivotally coupled to the second section 74 of the first right wing toolbar 28 by the right connection assembly 52. However, in other embodiments, the second right wing toolbar may be pivotally coupled to the first section of the first right wing toolbar by the right connection assembly. While the first right wing toolbar 28 has two sections in the illustrated embodiment, in other embodiments, the first right wing toolbar may include more or fewer sections (e.g., 1, 3, 4, or more), in which each pair of adjacent sections is pivotally coupled by a respective right wing joint. Furthermore, while the second right wing toolbar 30 has a single section in the illustrated embodiment, in other embodiments, the second right wing toolbar may include multiple sections (e.g., pivotally coupled to one another, spaced apart from one another, etc.), and each section of the second right wing toolbar may be pivotally coupled to a respective section of the first right wing toolbar.

In the illustrated embodiment, the main frame 14 includes a first row unit support bar 78 and a second row unit support bar 80. As illustrated, the first row unit support bar 78 is positioned forward of the second row unit support bar 80 along the direction of travel 64. Multiple mounts are coupled to each support bar. Accordingly, the first row unit support bar 78 is configured to support a first set of row units, and the second row unit support bar 80 is configured to support a second set of row units. The row units coupled to the support bars of the main frame 14 may establish respective rows of deposited agricultural product within the field (e.g., between the rows of deposited agricultural product established by the row units supported by the left wing toolbars and the rows of deposited agricultural product established by the row units supported by the right wing toolbars). While the main frame is configured to support multiple row units in the illustrated embodiment, in other embodiments, the main frame may not be configured to support row units.

Figure 3:
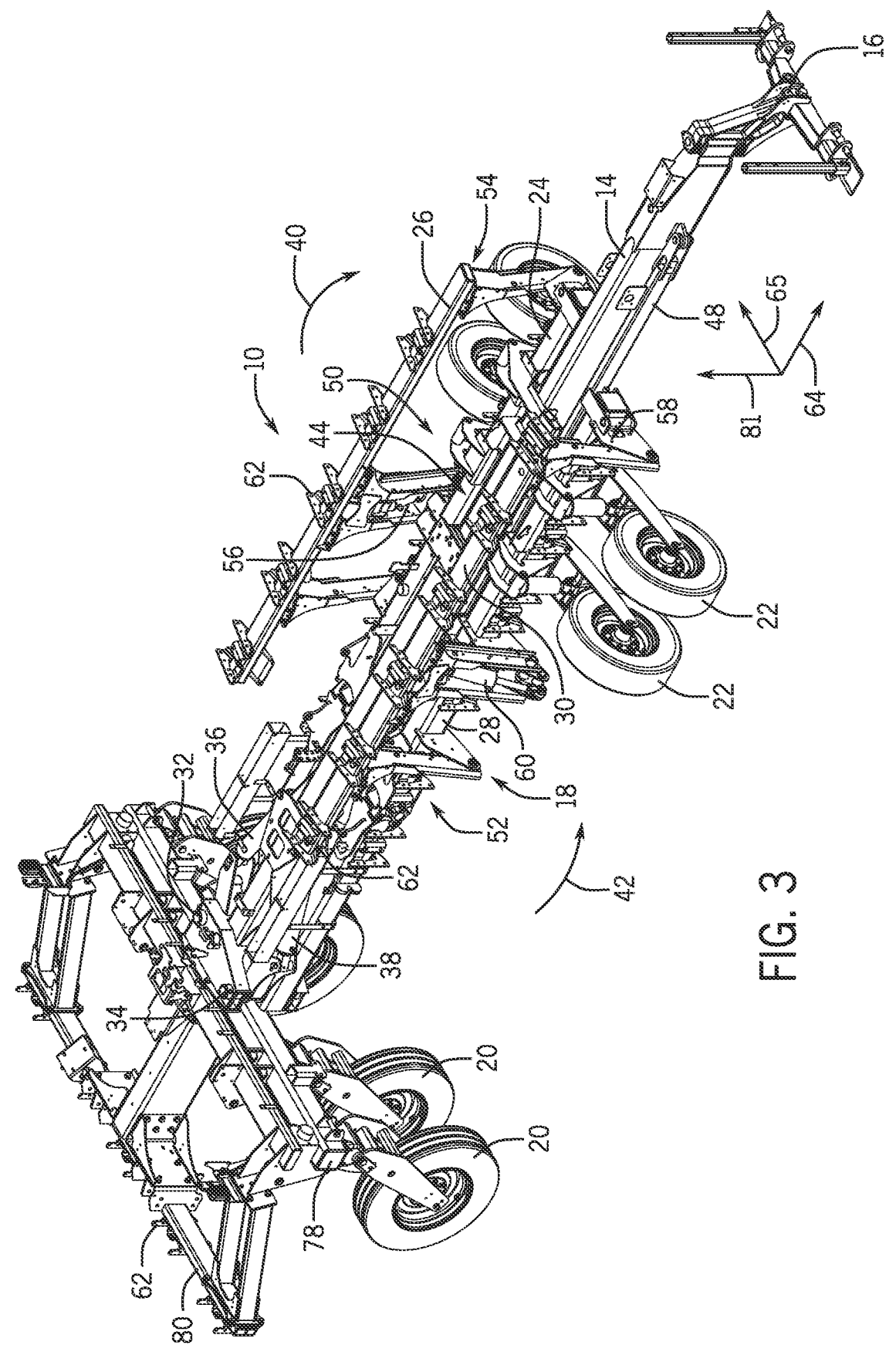
FIG. 3 is a perspective view of a portion of the agricultural planting implement of FIG. 1, in which the agricultural planting implement is in a transport configuration.

FIG. 3 is a perspective view of a portion of the agricultural planting implement 10 of FIG. 1, in which the agricultural planting implement 10 is in the transport configuration. With the agricultural planting implement 10 in the illustrated transport configuration, the main wheel assemblies 20 are lowered to the transport position, the wing toolbars are folded forwardly, and the wing wheel assemblies 22 are oriented perpendicularly to the direction of travel 64 and positioned above the soil surface. In addition, with the wing toolbars of the toolbar assembly 18 folded forwardly, the telescoping section 44 of the main frame 14 is extended. Furthermore, the second left wing toolbar 26 is in the transport position, in which the second left wing toolbar 26 is positioned above the first left wing toolbar 24 (e.g., along a vertical axis 81), and the second right wing toolbar 30 is in the transport position, in which the second right wing toolbar 30 is positioned above the first right wing toolbar 28 (e.g., along the vertical axis 81). Because the second wing toolbars are positioned above the first wing toolbars while the agricultural planting implement is in the transport configuration, the width of the agricultural planting implement may be reduced for transport, thereby facilitating movement of the agricultural planting implement (e.g., between fields, to a storage area, etc.).

Figure 4:
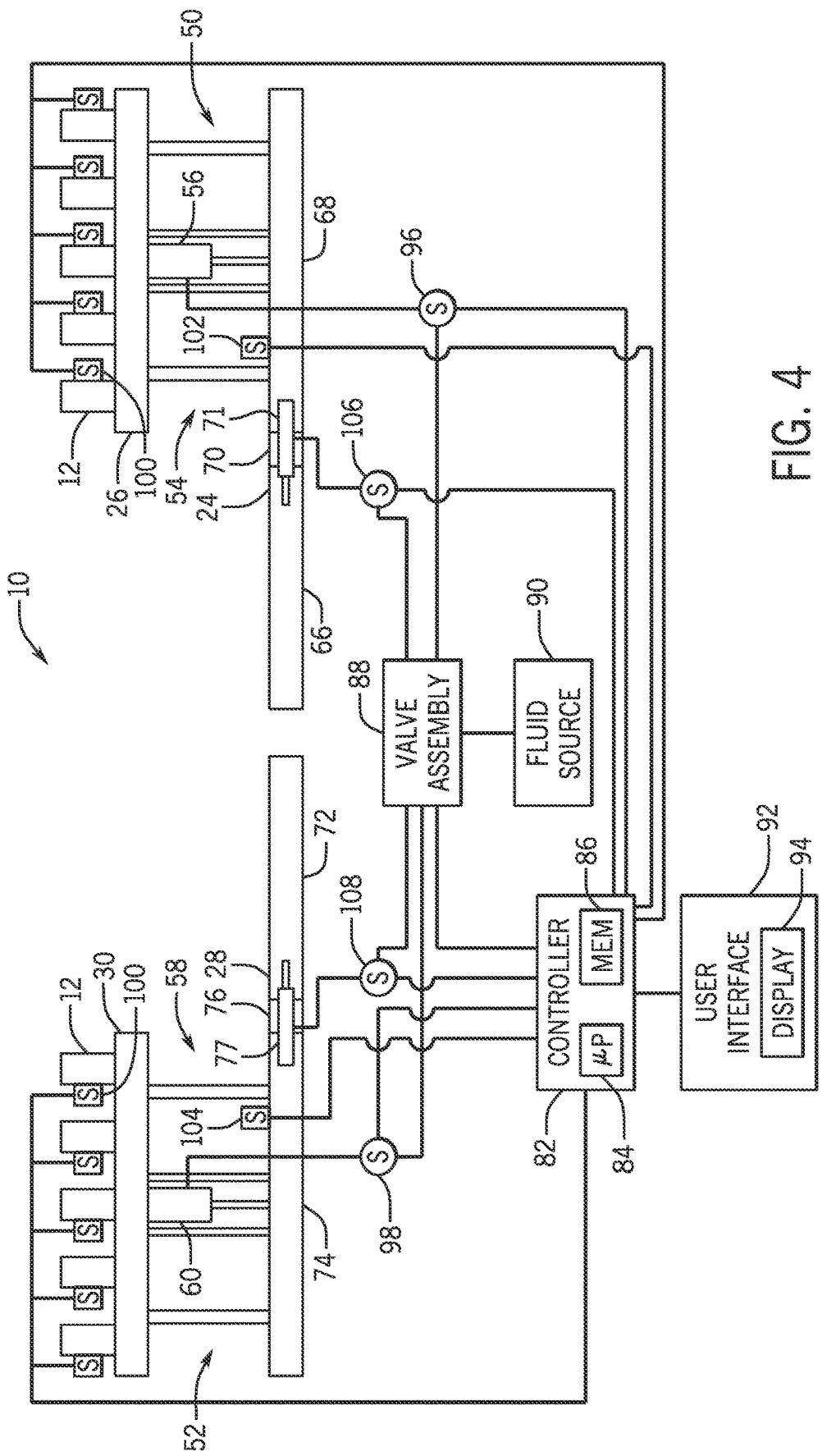
FIG. 4 is a schematic diagram of an embodiment of the agricultural planting implement.

FIG. 4 is a schematic diagram of an embodiment of the agricultural planting implement 10. As previously discussed, the left actuator 56 (e.g., second wing actuator) is configured to drive the second left wing toolbar 26 to rotate upwardly relative to the first left wing toolbar 24 from the working position to the transport position. In addition, the left actuator 56 is configured to urge the second left wing toolbar 26 toward the soil surface while the second left wing toolbar 26 is in the working position. The right actuator 60 (e.g., second wing actuator) is configured to drive the second right wing toolbar 30 to rotate upwardly relative to the first right wing toolbar 28 from the working position to the transport position. In addition, the right actuator 60 is configured to urge the second right wing toolbar 30 toward the soil surface while the second right wing toolbar 30 is in the working position.

In the illustrated embodiment, the agricultural planting implement 10 includes a controller 82 communicatively coupled to the left actuator 56 and to the right actuator 60. The controller 82 may be coupled to any suitable portion of the agricultural planting implement 10 (e.g., the main frame, etc.), to the work vehicle towing the agricultural implement, to another suitable structure, or a combination thereof (e.g., the controller may be distributed among multiple controller sections). The controller 82 is configured to selectively instruct the left actuator 56 to drive the second left wing toolbar 26 upwardly from the working position to the transport position, and the controller 82 is configured to selectively instruct the left actuator 56 to urge the second left wing toolbar 26 downwardly toward the soil surface. In addition, the controller 82 is configured to selectively instruct the right actuator 60 to drive the second right wing toolbar 30 upwardly from the working position to the transport position, and the controller 82 is configured to selectively instruct the right actuator 60 to urge the second right wing toolbar 30 downwardly toward the soil surface.

In certain embodiments, the controller 82 is an electronic controller having electrical circuitry configured to control the left actuator 56 and the right actuator 60. In the illustrated embodiment, the controller 82 includes a processor, such as the illustrated microprocessor 84, and a memory device 86. The controller 82 may also include one or more storage devices and/or other suitable components. The processor 84 may be used to execute software, such as software for controlling the left actuator 56 and the right actuator 60, and so forth. Moreover, the processor 84 may include multiple microprocessors, one or more "general-purpose" microprocessors, one or more special-purpose microprocessors, and/or one or more application specific integrated circuits (ASICs), or some combination thereof. For example, the processor 84 may include one or more reduced instruction set (RISC) processors.

The memory device 86 may include a volatile memory, such as random access memory (RAM), and/or a nonvolatile memory, such as read-only memory (ROM). The memory device 86 may store a variety of information and may be used for various purposes. For example, the memory device 86 may store processor-executable instructions (e.g., firmware or software) for the processor 84 to execute, such as instructions for controlling the left actuator 56 and the right actuator 60, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the left actuator 56 and the right actuator 60, etc.), and any other suitable data.

In certain embodiments, the left actuator 56 includes a hydraulic actuator, and the right actuator 60 includes a hydraulic actuator. In such embodiments, the agricultural planting implement 10 includes a valve assembly 88 communicatively coupled to the controller 82, and the valve assembly 88 is fluidly coupled to the left actuator 56 and to the right actuator 60. The valve assembly 88 may be coupled to any suitable portion of the agricultural planting implement 10 (e.g., the main frame, etc.), to the work vehicle towing the agricultural implement, to another suitable structure, or a combination thereof (e.g., the valve assembly may be distributed among multiple valve assembly sections). In the illustrated embodiment, the left and right actuators are fluidly coupled to the valve assembly 88 in a parallel flow arrangement. However, in other embodiments, the left and right actuators may be fluidly coupled to the valve assembly in a serial flow arrangement or in another suitable flow arrangement (e.g., a combination of serial and parallel, etc.).

The valve assembly 88 is configured to control fluid flow to/from the left and right actuators to control the positions of the respective second wing toolbars and to control the force applied to the respective second wing toolbars. For example, in certain embodiments, to move each second wing toolbar from the working position to the transport position, the valve assembly 88 may enable fluid (e.g., hydraulic fluid) to flow from a fluid source 90 (e.g., including a reservoir and a pump) to a cap end of the respective actuator and to enable fluid to flow from a rod end of the respective actuator to a fluid drain. In addition, to move each second wing toolbar from the transport position to the working position and to urge the second wing toolbar downwardly toward the soil surface, the valve assembly 88 may enable fluid (e.g., hydraulic fluid) to flow from the fluid source 90 to the rod end of the respective actuator and to enable fluid to flow from the cap end of the respective actuator to the fluid drain. However, in other embodiments, to move at least one second wing toolbar from the working position to the transport position, the valve assembly may enable fluid to flow from the fluid source to the rod end of the respective actuator(s) and to enable fluid to flow from the cap end of the respective actuator(s) to the fluid drain. In addition, to move the at least one second wing toolbar from the transport position to the working position and to urge the second wing toolbar downwardly toward the soil surface, the valve assembly may enable fluid to flow from the fluid source to the cap end of the respective actuator(s) and to enable fluid to flow from the rod end of the respective actuator(s) to the fluid drain.

In the illustrated embodiment, the agricultural planting implement 10 includes a user interface 92 communicatively coupled to the controller 82. The user interface 92 is configured to receive input from an operator and to provide information to the operator. The user interface 92 may include any suitable input device(s) for receiving input, such as a keyboard, a mouse, button(s), switch(es), knob(s), other suitable input device(s), or a combination thereof. In addition, the user interface 92 may include any suitable output device(s) for presenting information to the operator, such as a speaker, indicator light(s), other suitable output device(s), or a combination thereof. In the illustrated embodiment, the user interface 92 includes a display 94 configured to present visual information to the operator. In certain embodiments, the display 94 may include a touchscreen interface configured to receive input from the operator.

In certain embodiments, while the second wing toolbars are in the working position, the operator may provide an input to the user interface 92 (e.g., via the touchscreen interface of the display 94) indicative of a target force for the left actuator 56 and the right actuator 60. The user interface 92, in turn, is configured to output a user input signal indicative of the target force to the controller 82, and the controller 82 is configured to receive the user input signal. The controller 82 is configured to control a force applied by the left actuator 56 and a force applied by the right actuator 60 based on the target force. For example, in certain embodiments, the controller 82 may determine a target fluid pressure for each of the left and right actuators based on the target force (e.g., based on the target force and the dimensions of the respective actuator). The controller 82 may then control the valve assembly 88 to substantially establish the respective target fluid pressure within the left actuator 56 and the respective target fluid pressure within the right actuator 60. In embodiments in which the dimensions of the left and right actuators are the same, the controller may establish a single target pressure for both the left and right actuators.

In the illustrated embodiment, the agricultural planting implement 10 includes a first pressure sensor 96 disposed along a fluid conduit extending between the valve assembly 88 and the left actuator 56, and the agricultural planting implement 10 includes a second pressure sensor 98 disposed along a fluid conduit extending between the valve assembly 88 and the right actuator 60. The first pressure sensor 96 and the second pressure sensor 98 are communicatively coupled to the controller 82, and each pressure sensor is configured to output a respective sensor signal to the controller indicative of the pressure within the respective actuator (e.g., within the end of the respective actuator that receives fluid to urge the respective second wing toolbar downwardly toward the soil surface). The controller 82 controls the valve assembly 88 based on the respective sensor signals to substantially establish the target fluid pressure(s) within the left actuator 56 and the right actuator 60. While a single target force is disclosed above, in certain embodiments, a target force for each actuator may be input into the user interface, and the controller may control the force applied by each actuator based on the respective target force. Furthermore, while closed-loop control of the fluid pressure(s) based on feedback from the pressure sensors is disclosed above, in certain embodiments, the controller may be configured to control the valve assembly (e.g., for at least one actuator) based on open-loop control (e.g., based on a fluid pressure/valve position relationship, such as a look-up table, an empirical formula, etc.).

In certain embodiments, the controller 82 is configured to output signal(s) to the user interface 92 indicative of the fluid pressures within the left and right actuators, and the user interface 92, in turn, is configured to present the fluid pressures to the operator (e.g., via the display 94). In addition, in certain embodiments, the controller 82 is configured to determine the forces applied by the left and right actuators based on the fluid pressures within the left and right actuators (e.g., based on the fluid pressures and the dimensions of the actuators). In such embodiments, the controller 82 is configured to output signal(s) to the user interface 92 indicative of the forces applied by the left and right actuators, and the user interface 92, in turn, is configured to present the forces to the operator (e.g., via the display 94).

In the illustrated embodiment, each row unit 12 includes a respective force sensor 100, and each force sensor 100 is communicatively coupled to the controller 82. Each force sensor 100 is configured to output a sensor signal indicative of a force applied by the respective row unit 12 (e.g., the gauge wheel(s) of the respective row unit, etc.) to the soil surface. For example, each force sensor 100 may include a load cell or a strain gauge coupled to a gauge wheel arm that supports the gauge wheel(s) on a frame of the respective row unit. The controller 82 is configured to determine the force applied by each row unit 12 (e.g., of the second sets of row units) to the soil surface based on the respective sensor signal.

In certain embodiments, the controller 82 may output signal(s) to the user interface 92 indicative of the forces applied by the row units 12 (e.g., of the second sets of row units) to the soil surface, and the user interface 92, in turn, may present the forces to the operator (e.g., via the display 94). Additionally or alternatively, the controller 82 may determine the average force applied by the row units 12 coupled to the second left wing toolbar 26, the average force applied by the row units 12 coupled to the second right wing toolbar 30, the maximum and/or minimum force applied by the row units 12 coupled to the second left wing toolbar 26, the maximum and/or minimum force applied by the row units 12 coupled to the second right wing toolbar 30, the average force applied by the row units 12 coupled to the second left wing toolbar 26 and the second right wing toolbar 30, the maximum and/or minimum force applied by the row units 12 coupled to the second left wing toolbar 26 and the second right wing toolbar 30, or a combination thereof. The controller 82 may then output signal(s) to the user interface 92 indicative of the determined force(s), and the user interface 92, in turn, may present the force(s) to the operator (e.g., via the display 94). The user may control the target force(s) based on the force(s) presented by the user interface. For example, the user may set the target force(s) to establish a desired minimum force applied by the row units 12 coupled to the second left wing toolbar 26 and the second right wing toolbar 30, thereby enabling the row units 12 to substantially maintain contact with the soil surface during operation of the agricultural planter 10.

In certain embodiments, while the second wing toolbars are in the working position, the controller 82 is configured to automatically determine a respective target downforce for each of the left and right actuators based on the forces (e.g., row unit forces) applied by the respective second set of row units (e.g., the gauge wheels of the row units) to the soil surface. For example, the controller may determine the respective target downforce based on a total/cumulative force applied by the respective second set of row units to the soil surface (e.g., the respective target force may equal the total/cumulative force applied by the respective second set of row units plus an offset). Furthermore, the controller 82 is configured to control the force applied by the left actuator 56 based on the target force for the left actuator 56, and the controller 82 is configured to control the force applied by the right actuator 60 based on the target force for the right actuator 60. For example, in certain embodiments, the controller 82 is configured to determine a respective target fluid pressure for each of the left and right actuators based on the target forces (e.g., based on each target force and the dimensions of the respective actuator). The controller 82 is also configured to control the valve assembly 88 to substantially establish the respective target fluid pressure within the left actuator 56 and the respective target fluid pressure within the right actuator 60 (e.g., based on the sensor signals from the pressure sensors). While determining each target downforce based on the total/cumulative force applied by the respective second set of row units to the soil surface is disclosed above, in other embodiments, each target downforce may be determined in any other suitable manner based on the forces applied by the respective second set of row units (e.g., based on the minimum row unit force applied by the respective second set of row units, based on the maximum row unit force applied by the respective second set of row units, based on the average row unit force applied by the respective second set of row units, etc.).

Furthermore, in certain embodiments, while the second wing toolbars are in the working position, the controller 82 is configured to automatically determine a target downforce for the second left wing toolbar 26 and the second right wing toolbar 30 based on the forces (e.g., row unit forces) applied by the second sets of row units (e.g., the gauge wheels of the row units) to the soil surface. For example, the controller may be configured to determine the target downforce based on a total/cumulative force applied by the second set of row units coupled to the second left wing toolbar 26 and the total/cumulative force applied by the second set of row units coupled to the second right wing toolbar 30. In certain embodiments, the controller may determine a second wing toolbar net force for each second wing toolbar, in which the second wing toolbar net force equals the total/cumulative force of the respective second set of row units. The controller may then determine the target downforce by adding the maximum of the second wing toolbar net forces to an offset (e.g., 0 pounds, 100 pounds, 200 pounds, 300 pounds, 400 pounds, 500 pounds, etc.). Once the target downforce is determined, the controller 82 may control the force applied by the left actuator 56 based on the target force, and the controller 82 may control the force applied by the right actuator 60 based on the target force. For example, in certain embodiments, the controller 82 may determine a respective target fluid pressure for each of the left and right actuators based on the target force (e.g., based on the target force and the dimensions of each actuator). The controller 82 may then control the valve assembly 88 to substantially establish the respective target fluid pressure within the left actuator 56 and the respective target fluid pressure within the right actuator 60 (e.g., based on the sensor signals from the pressure sensors). While determining the target downforce based on the total/cumulative force applied by the second set of row units coupled to the second left wing toolbar and the total/cumulative force applied by the second set of row units coupled to the second right wing toolbar is disclosed above, in other embodiments, the target downforce may be determined in any other suitable manner based on the forces applied by the second sets of row units (e.g., based on the minimum row unit force applied by the second sets of row units, based on the maximum row unit force applied by the second sets of row units, based on the average row unit force applied by the second sets of row units, etc.).

In certain embodiments, the controller 82 may determine the force applied by each row unit to the soil surface based on a moving average of the applied forces. For example, the force sensor 100 may output the sensor signal indicative of the force applied by the respective row unit to the soil surface at a frequency (e.g., 0.5 Hz, 1 Hz, 2 Hz, 3 Hz, 4 Hz, 5 Hz, 6 Hz, etc.). The controller 82 may receive each sensor signal from each sensor, determine the force for each sample, and average the forces over the number of samples (e.g., 5 samples, 10 samples, 20 samples, 50 samples, 100 samples, 150 samples, 200 samples, etc.). The average may be updated for each sample, thereby establishing a moving average. While determining the force applied by each row unit based on a moving average of the applied forces is disclosed above, in other embodiments, the force applied by each row unit may be determined in any other suitable manner (e.g., the force applied by at least one row unit may be based on the instantaneous force applied by the row unit).

In certain embodiments, the controller 82 is configured to output signal(s) to the user interface 92 indicative of the determined target force(s), and the user interface 92, in turn, is configured to present the target force(s) to the operator (e.g., via the display 94). In addition, in certain embodiments, the controller 82 is configured to output signal(s) to the user interface 92 indicative of the determined fluid pressures within the left and right actuators (e.g., which are based on the target force(s)), and the user interface 92, in turn, is configured to present the determined fluid pressures to the operator (e.g., via the display 94). Furthermore, in certain embodiments, the controller 82 is configured to output signal(s) to the user interface 92 indicative of the measured fluid pressures within the left and right actuators (e.g., based on feedback from the pressure sensors), and the user interface 92, in turn, is configured to present the measured fluid pressures to the operator (e.g., via the display 94). In certain embodiments, the controller 82 is configured to determine the forces applied by the left and right actuators based on the fluid pressures within the left and right actuators (e.g., based on the fluid pressures and the dimensions of the actuators). In such embodiments, the controller 82 is configured to output signal(s) to the user interface 92 indicative of the forces applied by the left and right actuators, and the user interface 92, in turn, is configured to present the forces to the operator (e.g., via the display 94).

Furthermore, in certain embodiments, the controller 82 is configured to output signal(s) to the user interface 92 indicative of the forces applied by the row units 12 (e.g., of the second sets of row units), and the user interface 92, in turn, is configured to present the forces to the operator (e.g., via the display 94). Additionally or alternatively, in certain embodiments, the controller 82 is configured to determine the average force applied by the second set of row units 12 coupled to the second left wing toolbar 26, the average force applied by the second set of row units 12 coupled to the second right wing toolbar 30, the maximum and/or minimum force applied by the row units 12 coupled to the second left wing toolbar 26, the maximum and/or minimum force applied by the row units 12 coupled to the second right wing toolbar 30, the average force applied by the row units 12 coupled to the second left wing toolbar 26 and the second right wing toolbar 30, the maximum and/or minimum force applied by the row units 12 coupled to the second left wing toolbar 26 and the second right wing toolbar 30, or a combination thereof. In such embodiments, the controller 82 is configured to output signal(s) to the user interface 92 indicative of the determined force(s), and the user interface 92, in turn, is configured to present the force(s) to the operator (e.g., via the display 94).

In the illustrated embodiment, the agricultural planting implement 10 includes a first position sensor 102 and a second position sensor 104, and each position sensor is communicatively coupled to the controller 82. The first position sensor 102 is configured to output a sensor signal indicative of a position (e.g., angular position, vertical position, etc.) of the second left wing toolbar 26 relative to the first left wing toolbar 24 (e.g., relative to the second section 68 of the first left wing toolbar 24), and the second position sensor 104 is configured to output a sensor signal indicative of a position (e.g., angular position, vertical position, etc.) of the second right wing toolbar 30 relative to the first right wing toolbar 28 (e.g., relative to the second section 74 of the first right wing toolbar 28). Each position sensor may include any suitable device(s) configured to facilitate determination of the position of the respective second wing toolbar relative to the respective first wing toolbar. For example, each position sensor may include a contact sensor, a force sensor, a potentiometer, an optical sensor, a proximity sensor, other suitable type(s) of sensor (s), or a combination thereof.

In certain embodiments, each of the first and second actuators is configured to urge the respective second wing toolbar downwardly toward the soil surface such that at least one component of the respective second wing toolbar/connector assembly engages a respective stop. During normal operation, the component(s) may remain in contact with the stop(s). However, in response to an excessive load applied to a second set of row units (e.g., due to the row units engaging an obstacle within the field), the respective second wing toolbar may move upwardly. After the load is reduced, the respective second wing toolbar may move downwardly, such that the component(s) contact the stop(s). As previously discussed, each position sensor may include a contact sensor and/or a force sensor. The contact sensor may be configured to output a sensor signal indicative of contact between a component and the respective stop, and the force sensor may be configured to output a sensor signal indicative of an engagement force between a component and the respective stop.

While the second left wing toolbar 26 is in the working position, the controller 82 is configured to control the force applied by the left actuator 56 based on the position of the second left wing toolbar 26 relative to the first left wing toolbar 24. In addition, while the second right wing toolbar 30 is in the working position, the controller 82 is configured to control the force applied by the right actuator 60 based on the position of the second right wing toolbar 30 relative to the first right wing toolbar 28. For example, the controller 82 may control the force applied by the actuators such that the components maintain contact with the respective stops (e.g., such that target engagement force(s) between the components and the respective stops is established). In certain embodiments, the controller 82 may control the valve assembly 88 to adjust the fluid pressure within the left actuator 56 and/or the right actuator 60 to establish contact between the respective component(s) and the respective stop(s). Furthermore, in certain embodiments, the controller 82 may control the valve assembly 88 to adjust the fluid pressure within the left actuator 56 and/or the right actuator 60 to substantially establish target engagement force(s) between the respective component(s) and the respective stop(s) (e.g., substantially the minimum force(s) sufficient to establish contact between the respective component(s) and the respective stop(s)).

In certain embodiments, the controller 82 is configured to output signal(s) to the user interface 92 indicative of the measured fluid pressures within the left and right actuators (e.g., based on feedback from the pressure sensors), and the user interface 92, in turn, is configured to present the measured fluid pressures to the operator (e.g., via the display 94). In certain embodiments, the controller 82 is configured to determine the forces applied by the left and right actuators based on the fluid pressures within the left and right actuators (e.g., based on the fluid pressures and the dimensions of the actuators). In such embodiments, the controller 82 is configured to output signal(s) to the user interface 92 indicative of the forces applied by the left and right actuators, and the user interface 92, in turn, is configured to present the forces to the operator (e.g., via the display 94).

Furthermore, in certain embodiments, the controller 82 is configured to output signal(s) to the user interface 92 indicative of the forces applied by the row units 12 (e.g., of the second sets of row units), and the user interface 92, in turn, is configured to present the forces to the operator (e.g., via the display 94). Additionally or alternatively, in certain embodiments, the controller 82 is configured to determine the average force applied by the second set of row units 12 coupled to the second left wing toolbar 26, the average force applied by the second set of row units 12 coupled to the second right wing toolbar 30, the maximum and/or minimum force applied by the row units 12 coupled to the second left wing toolbar 26, the maximum and/or minimum force applied by the row units 12 coupled to the second right wing toolbar 30, the average force applied by the row units 12 coupled to the second left wing toolbar 26 and the second right wing toolbar 30, the maximum and/or minimum force applied by the row units 12 coupled to the second left wing toolbar 26 and the second right wing toolbar 30, or a combination thereof. In such embodiments, the controller 82 is configured to output signal(s) to the user interface 92 indicative of the determined force(s), and the user interface 92, in turn, is configured to present the force(s) to the operator (e.g., via the display 94).

As discussed above, the controller 82 may operate in three different modes, including the manual force control mode, the automatic force control mode, and the automatic position control mode. The user interface 92 may include one or more controls (e.g., physical controls and/or virtual controls on the display 94) configured to enable an operator to switch between modes. Furthermore, while the controller is configured to operate in three modes in the present embodiment, in other embodiments, the controller may only operate in one or two of the modes disclosed above. In such embodiments, the sensor(s) associated with the mode of operation (e.g., the force sensors 100 for the automatic force control mode, the position sensors for the automatic position control mode, etc.) may be omitted. In addition, the controller may be configured to operate in other/additional suitable mode(s) (e.g., alone or in combination with the modes disclosed above).

In the illustrated embodiment, the controller 82 is configured to control the force applied by the left wing actuator 71 and the force applied by the right wing actuator 77. In certain embodiments, while the second wing toolbars are in the working position, the operator may provide an input to the user interface 92 (e.g., via the touchscreen interface of the display 94) indicative of a target force for the left wing actuator 71 and the right wing actuator 77. The user interface 92, in turn, is configured to output a user input signal indicative of the target force to the controller 82, and the controller 82 is configured to receive the user input signal. The controller 82 is configured to control a force applied by the left wing actuator 71 and a force applied by the right wing actuator 77 based on the target force. For example, in certain embodiments (e.g., in embodiments in which each of the left and right wing actuators includes a hydraulic actuator), the controller 82 may determine a target fluid pressure for each of the left and right wing actuators based on the target force (e.g., based on the target force and the dimensions of the respective actuator). The controller 82 may then control the valve assembly 88 to substantially establish the respective target fluid pressure within the left wing actuator 71 and the respective target fluid pressure within the right wing actuator 77. In embodiments in which the dimensions of the left and right wing actuators are the same, the controller may establish a single target pressure for both the left and right wing actuators.

In the illustrated embodiment, the agricultural planting implement 10 includes a first wing pressure sensor 106 disposed along a fluid conduit extending between the valve assembly 88 and the left wing actuator 71, and the agricultural planting implement 10 includes a second wing pressure sensor 108 disposed along a fluid conduit extending between the valve assembly 88 and the right wing actuator 77. The first wing pressure sensor 106 and the second wing pressure sensor 108 are communicatively coupled to the controller 82, and each pressure sensor is configured to output a respective sensor signal to the controller indicative of the pressure within the respective actuator (e.g., within the end of the respective actuator that receives fluid to urge the second section of the respective first wing toolbar and the respective second wing toolbar downwardly toward the soil surface). The controller 82 controls the valve assembly 88 based on the respective sensor signals to substantially establish the target fluid pressure(s) within the left wing actuator 71 and the right wing actuator 77. While a single target force is disclosed above, in certain embodiments, a target force for each wing actuator may be input into the user interface, and the controller may control the force applied by each wing actuator based on the respective target force. Furthermore, while closed-loop control of the fluid pressure(s) based on feedback from the pressure sensors is disclosed above, in certain embodiments, the controller may be configured to control the valve assembly (e.g., for at least one actuator) based on open-loop control (e.g., based on a fluid pressure/ valve position relationship, such as a look-up table, an empirical formula, etc.).

In certain embodiments, the controller 82 is configured to output signal(s) to the user interface 92 indicative of the fluid pressures within the left and right wing actuators, and the user interface 92, in turn, is configured to present the fluid pressures to the operator (e.g., via the display 94). In addition, in certain embodiments, the controller 82 is configured to determine the forces applied by the left and right wing actuators based on the fluid pressures within the left and right wing actuators (e.g., based on the fluid pressures and the dimensions of the actuators). In such embodiments, the controller 82 is configured to output signal(s) to the user interface 92 indicative of the forces applied by the left and right wing actuators, and the user interface 92, in turn, is configured to present the forces to the operator (e.g., via the display 94).

In certain embodiments, at least one row unit 12 (e.g., each row unit coupled to the second wing toolbars) includes an adjustable downforce actuator configured to control the force applied by the row unit (e.g., the gauge wheel(s) of the row unit) to the soil surface. For example, the adjustable downforce actuator may include one or more hydraulic actuators, one or more pneumatic actuators, one or more actuators of other suitable type(s), or a combination thereof. In such embodiments, the force applied by the row unit to the soil surface is based at least in part on the force applied by the downforce actuator and the weight of the row unit.

While a single actuator is configured to drive each second wing toolbar to rotate between the working and transport positions and to urge the second wing toolbar downwardly toward the soil surface while the second wing toolbar is in the working position in the illustrated embodiment, in other embodiments, multiple actuators (e.g., linear actuator(s), rotary actuator(s), other suitable type(s) of actuator(s), or a combination thereof) may be coupled to at least one second wing toolbar, and the actuators may be configured to cooperatively drive the second wing toolbar to rotate between the working and transport positions and to urge the second wing toolbar downwardly toward the soil surface while the second wing toolbar is in the working position. In such embodiments, the controller may be configured to determine the target fluid pressure based on the target force and the number of actuators coupled to the respective second wing toolbar. Furthermore, while each actuator of the left actuator, the right actuator, the left wing actuator, and the right wing actuator includes a hydraulic actuator in the illustrated embodiment, in other embodiments, at least one actuator may include any other suitable type of actuator, such as a pneumatic actuator or an electromechanical actuator. In embodiments in which at least one actuator includes a pneumatic actuator, the valve assembly may include pneumatic valve(s), and the fluid source may include an air source. In addition, in embodiments in which at least one actuator includes an electromechanical actuator, the electromechanical actuator may be directly communicatively coupled to the controller. Furthermore, while the agricultural planting implement has two second wing toolbars in the illustrated embodiment, in other embodiments, the agricultural planting implement may include more or fewer second wing toolbars (e.g., 0, 1, 3, 4, 5, 6, or more). In such embodiments, respective actuator(s) may be coupled to each second wing toolbar, and the respective actuator(s) may be configured to drive the second wing toolbar to rotate between the working and transport positions and to urge the second wing toolbar downwardly toward the soil surface while the second wing toolbar is in the working position.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural planting implement, comprising:
a first wing toolbar configured to support a first plurality of row units;
a second wing toolbar configured to support a second plurality of row units; and
a connection assembly, comprising:
at least one arm pivotally coupling the second wing toolbar to the first wing toolbar, wherein the at least one arm is directly pivotally coupled to the first wing toolbar via a single respective pivot junction, such that a respective pivotal connection of the at least one arm to the first wing toolbar consists of the single respective pivot junction, and the at least one arm is non-pivotally coupled to the second wing toolbar; and
an actuator configured to drive the second wing toolbar to rotate upwardly relative to the first wing toolbar from a working position to a transport position, wherein the actuator is configured to urge the second wing toolbar downwardly toward a soil surface while the second wing toolbar is in the working position.

2. The agricultural planting implement of claim 1, comprising a controller comprising a processor and a memory, wherein the controller is configured to selectively instruct the actuator to drive the second wing toolbar upwardly from the working position to the transport position, and the controller is configured to selectively instruct the actuator to urge the second wing toolbar downwardly toward the soil surface.

3. The agricultural planting implement of claim 2, comprising a valve assembly communicatively coupled to the controller, wherein the actuator comprises a hydraulic actuator, and the hydraulic actuator is fluidly coupled to the valve assembly.

4. The agricultural planting implement of claim 2, comprising a sensor communicatively coupled to the controller, wherein the sensor is configured to output a sensor signal indicative of a position of the second wing toolbar relative to the first wing toolbar, and the controller is configured to control a force applied by the actuator based on the position of the second wing toolbar relative to the first wing toolbar.

5. The agricultural planting implement of claim 2, comprising a user interface communicatively coupled to the controller, wherein the controller is configured to receive a user input signal from the user interface indicative of a target force, and the controller is configured to control a force applied by the actuator based on the target force.

6. The agricultural planting implement of claim 2, wherein the controller is configured to determine a target force based on a plurality of row unit forces applied by the second plurality of row units to the soil surface, and the controller is configured to control a force applied by the actuator based on the target force.

7. The agricultural planting implement of claim 1, wherein the at least one arm comprises a plurality of arms spaced apart from one another along a length of the first wing toolbar.

8. The agricultural planting implement of claim 1, wherein the first wing toolbar is configured to pivotally couple to a main frame of the agricultural planting implement.

9. An agricultural planting implement, comprising:

a first wing toolbar configured to support a first plurality of row units, wherein the first wing toolbar comprises a first section and a second section, the second section is pivotally coupled to the first section, and the first section is configured to pivotally couple to a main frame of the agricultural planting implement;

a second wing toolbar configured to support a second plurality of row units; and a connection assembly, comprising:

at least one arm pivotally coupling the second wing toolbar to the second section of the first wing toolbar, wherein the at least one arm is directly pivotally coupled to the second section of the first wing toolbar via a single respective pivot junction, such that a respective pivotal connection of the at least one arm to the second section of the first wing toolbar consists of the single respective pivot junction, and the at least one arm is non-pivotally coupled to the second wing toolbar;

a first wing actuator coupled to the first and second sections of the first wing toolbar, wherein the first wing actuator is configured to urge the second section of the first wing toolbar downwardly toward a soil surface; and a second wing actuator configured to drive the second wing toolbar to rotate upwardly relative to the first wing toolbar from a working position to a transport position, wherein the second wing actuator is configured to urge the second wing toolbar downwardly toward the soil surface while the second wing toolbar is in the working position.

10. The agricultural planting implement of claim 9, comprising a controller comprising a processor and a memory, wherein the controller is configured to selectively instruct the second wing actuator to drive the second wing toolbar upwardly from the working position to the transport position, and the controller is configured to selectively instruct the second wing actuator to urge the second wing toolbar downwardly toward the soil surface.

11. The agricultural planting implement of claim 10, comprising a valve assembly communicatively coupled to the controller, wherein the second wing actuator comprises a hydraulic actuator, and the hydraulic actuator is fluidly coupled to the valve assembly.

12. The agricultural planting implement of claim 10, comprising a sensor communicatively coupled to the controller, wherein the sensor is configured to output a sensor signal indicative of a position of the second wing toolbar relative to the second section of the first wing toolbar, and the controller is configured to control a force applied by the second wing actuator based on the position of the second wing toolbar relative to the second section of the first wing toolbar.

13. The agricultural planting implement of claim 10, comprising a user interface communicatively coupled to the controller, wherein the controller is configured to receive a user input signal from the user interface indicative of a target force, and the controller is configured to control a force applied by the second wing actuator based on the target force.

14. The agricultural planting implement of claim 10, wherein the controller is configured to determine a target force based on a plurality of row unit forces applied by the second plurality of row units to the soil surface, and the controller is configured to control a force applied by the second wing actuator based on the target force.

15. An agricultural planting implement, comprising:

a first wing toolbar configured to support a first plurality of row units, wherein the first wing toolbar is configured to pivotally couple to a main frame of the agricultural planting implement;

a second wing toolbar configured to support a second plurality of row units, wherein the second wing toolbar is positioned behind the first wing toolbar along a direction of travel of the agricultural planting implement while the second wing toolbar is in a working position and the first wing toolbar is in an unfolded position; and a connection assembly, comprising:

at least one arm pivotally coupling the second wing toolbar to the first wing toolbar, wherein the at least one arm is directly pivotally coupled to the first wing toolbar via a single respective pivot junction, such that a respective pivotal connection of the at least one arm to the first wing toolbar consists of the single respective pivot junction, and the at least one arm is non-pivotally coupled to the second wing toolbar; and an actuator configured to urge the second wing toolbar downwardly toward a soil surface while the second wing toolbar is in the working position and the first wing toolbar is in the unfolded position, wherein the actuator is configured to drive the second wing toolbar to rotate upwardly relative to the first wing toolbar from the working position to a transport position, and the second wing toolbar is positioned above the first wing toolbar while the second wing toolbar is in the transport position.

16. The agricultural planting implement of claim 15, comprising a controller comprising a processor and a memory, wherein the controller is configured to selectively instruct the actuator to drive the second wing toolbar upwardly from the working position to the transport position, and the controller is configured to selectively instruct the actuator to urge the second wing toolbar downwardly toward the soil surface.

17. The agricultural planting implement of claim 16, comprising a valve assembly communicatively coupled to the controller, wherein the actuator comprises a hydraulic actuator, and the hydraulic actuator is fluidly coupled to the valve assembly.

18. The agricultural planting implement of claim 16, comprising a sensor communicatively coupled to the controller, wherein the sensor is configured to output a sensor signal indicative of a position of the second wing toolbar relative to the first wing toolbar, and the controller is configured to control a force applied by the actuator based on the position of the second wing toolbar relative to the first wing toolbar.

19. The agricultural planting implement of claim 16, comprising a user interface communicatively coupled to the controller, wherein the controller is configured to receive a user input signal from the user interface indicative of a target force, and the controller is configured to control a force applied by the actuator based on the target force.

20. The agricultural planting implement of claim 16, wherein the controller is configured to determine a target force based on a plurality of row unit forces applied by the second plurality of row units to the soil surface, and the controller is configured to control a force applied by the actuator based on the target force.

* * * * *